United States Patent [19]

Brehm, Jr. et al.

[11] 4,362,696

[45] Dec. 7, 1982

[54] CORROSION-RESISTANT FUEL CLADDING ALLOW FOR LIQUID METAL FAST BREEDER REACTORS

[75] Inventors: William F. Brehm, Jr., Richland; Richard P. Colburn, Pasco, both of Wash.

[73] Assignee: The United States of America as represented by the United States Department of Energy, Washington, D.C.

[21] Appl. No.: 41,273

[22] Filed: May 21, 1979

[51] Int. Cl.$^3$ .............................................. G21C 3/06
[52] U.S. Cl. .................................... 376/417; 376/457; 427/192
[58] Field of Search .................... 176/67, 82; 427/192; 148/31.5, 6, 6.11; 376/417, 457

[56] References Cited

U.S. PATENT DOCUMENTS

| 1,817,888 | 8/1931 | Lowe | 427/192 |
|---|---|---|---|
| 2,981,672 | 4/1961 | Kingston | 176/82 |
| 3,073,015 | 1/1963 | Wachtell et al. | |
| 3,345,197 | 10/1967 | Martini et al. | 427/192 |
| 3,359,176 | 12/1967 | Antill | 176/82 |
| 3,577,268 | 4/1971 | Whitfield et al. | 427/192 |
| 3,595,712 | 7/1971 | Boone et al. | 427/192 |
| 4,045,288 | 8/1977 | Armijo | 176/82 |

OTHER PUBLICATIONS

Metallurgical Transactions, vol. 9A, 2/78, pp. 143-149.

Primary Examiner—Harvey E. Behrend
Attorney, Agent, or Firm—J. J. Prizzi; R. A. Stoltz

[57] ABSTRACT

An aluminide coating for a fuel cladding tube for LMFBRs (liquid metal fast breeder reactors) such as those using liquid sodium as a heat transfer agent. The coating comprises a mixture of nickel-aluminum intermetallic phases and presents good corrosion resistance to liquid sodium at temperatures up to 700° C. while additionally presenting a barrier to outward diffusion of $^{54}$Mn.

3 Claims, No Drawings

CORROSION-RESISTANT FUEL CLADDING ALLOW FOR LIQUID METAL FAST BREEDER REACTORS

GOVERNMENT CONTRACT

The invention was conceived during the performance of work under Contract AT(11-1)2170 of the Department of Energy.

BACKGROUND OF THE INVENTION

While not limited thereto, the present invention is particularly adapted for use with fast breeder nuclear reactors employing a liquid sodium as a heat transfer agent. In such reactors, a fuel rod cladding alloy must be used which has good resistance to corrosion by the sodium on the outer surface of the cladding (i.e., wall thinning). At the same time, the cladding material should act as a diffusion barrier to outward diffusion of $^{54}Mn$ from the fuel cladding to the sodium.

At the present time, nickel-chromium base alloys or stainless steel containing at least 10% nickel are used as the cladding material. While these materials are generally satisfactory for their intended usage, there is always a need for further improvement in corrosion resistance and other properties in the highly-corrosive liquid sodium environment.

SUMMARY OF THE INVENTION

The present invention resides in the discovery that sodium corrosion resistance and reduced outward diffusion of $^{54}Mn$ can be greatly enhanced by providing on the surface of a nuclear fuel element cladding tube an aluminide coating having a thickness of about 1 to 1.5 mils. The aluminide coating comprises a mixture of nickel-aluminum intermetallic phases, NiAl and Ni$_3$Al being the most prevalent; however it is possible that Ni$_2$Al$_3$, Al$_2$O$_3$ and complex Ni-Al-O oxides are also present.

The coating of the invention minimizes sodium-side cladding wastage and materially reduces radionuclide release to the heat transport loops of the reactor. The reduction of cladding wastage permits a higher fuel-to-cladding ratio in core design (i.e., maximizes the amount of fuel for a given area), thus improving breeding gain. The decreases in radionuclide transport results in less downtime for maintenance, less shielding in maintenance areas, and permits longer fuel cycle operation at higher temperatures. All of these factors decrease plant capital cost and improve the fuel-steam cycle economics of the installation.

In order to form the nickel-aluminum intermetallic phases, the cladding tube itself is preferably formed from a stainless steel alloy containing at least 10% nickel (i.e., the 300 Series) or a nickel-chromium base alloy such as that described, for example, in copending application Ser. No. 917,832 filed June 22, 1978, now U.S. Pat. No. 4,236,943, application Ser. No. 917,834, also filed June 22, 1978, now U.S. Pat. No. 4,225,364, both applications being assigned to the assignee of the present application. The aluminide coating is formed by well-known aluminizing techniques wherein a layer of aluminum or an aluminum compound is diffused into the surface of a cladding tube to form the aforesaid coating having a thickness of about 1 to 1.5 mils.

DETAILED DESCRIPTION OF THE INVENTION

In carrying out the process of the invention, the cladding tubes are submitted to an aluminum diffusion process such as that described in U.S. Pat. No. 3,073,015 issued Jan. 16, 1963. However, any aluminization process can be used wherein aluminum and/or an aluminum compound is disposed on the surface of the cladding tube which is then heated in order to cause the aluminum to diffuse into the outer surface of the cladding tube.

In the preferred practice of the invention, the cladding tube is packed in a mixture of powders such as pure aluminum powder, a halide activator such as sodium fluoride in powder form and aluminum oxide powder. The tube, packed within the aforesaid mixture of powders, is then heated to a temperature of about 1800° F. for a sufficient period of time to produce a layer of the desired depth. In the heating process, aluminum fluoride is formed which diffuses into the surface of the metal to produce nickel-aluminum intermetallic phases. The following Table I gives the composition of the aluminized coating at various depths beneath the surface;

TABLE I

Sample #761131 Aluminized 718

| Microns From Edge | Fe | Cr | Ni | Nb | Ti | Al |
|---|---|---|---|---|---|---|
| −2 | 3.67 | | 9.39 | | | 3.97 |
| −1 | 6.31 | 4.55 | 23.99 | 0.00 | | 13.37 |
| 0 | 11.10 | 9.96 | 42.35 | .74 | 0.06 | 32.44 |
| 1 | 13.02 | 7.09 | 45.55 | 1.63 | .08 | 36.39 |
| 2 | 14.06 | 8.81 | 43.07 | 2.11 | .11 | 35.49 |
| 3 | 14.78 | 12.32 | 41.07 | 3.00 | .13 | 34.93 |
| 4 | 14.40 | 6.81 | 45.27 | 2.33 | .19 | 37.27 |
| 5 | 15.12 | 7.48 | 42.70 | 2.04 | .19 | 37.45 |
| 6 | 15.38 | 8.81 | 40.87 | 4.48 | .19 | 34.58 |
| 7 | 15.30 | 12.96 | 41.66 | 5.27 | .23 | 33.70 |
| 8 | 15.52 | 9.20 | 41.89 | 2.90 | .27 | 36.17 |
| 9 | 15.15 | 10.15 | 40.80 | | .27 | 36.02 |
| 10 | 13.79 | 8.40 | 45.80 | 2.31 | .26 | 36.90 |
| 11 | 12.87 | 5.75 | 48.17 | 1.13 | .22 | 36.69 |
| 12 | 11.64 | 9.32 | 48.77 | 1.97 | .23 | 36.30 |
| 13 | 10.07 | 15.21 | 51.08 | 2.71 | .21 | 36.99 |
| 14 | 9.37 | 22.96 | 49.11 | 3.93 | .24 | 33.97 |
| 15 | 9.15 | 13.67 | 45.38 | 6.20 | .32 | 31.36 |
| 16 | 7.72 | 8.53 | 48.28 | 6.34 | .32 | 33.02 |
| 17 | 7.66 | 9.73 | 49.20 | 3.98 | .28 | 32.83 |
| 18 | 7.30 | 8.78 | 50.01 | 3.12 | .24 | 33.59 |
| 19 | 7.78 | 6.67 | 46.92 | 3.68 | .27 | 30.53 |
| 20 | 5.66 | 5.91 | 54.83 | 1.97 | .17 | 36.38 |
| 21 | 5.04 | 6.01 | 58.42 | 3.53 | .29 | 39.56 |
| 22 | 5.77 | 8.73 | 55.80 | 5.32 | .37 | 37.01 |
| 23 | 5.22 | 15.01 | 53.89 | 4.76 | .68 | 33.82 |
| 24 | 5.31 | 23.19 | 53.68 | 8.76 | .67 | 34.70 |
| 25 | 9.68 | 25.68 | 45.09 | 11.39 | .95 | 27.91 |
| 26 | 14.14 | 28.88 | 27.43 | 11.19 | 1.46 | 20.69 |
| 27 | 15.04 | 31.21 | 25.67 | 10.91 | 1.62 | 13.77 |
| 28 | 17.59 | 26.12 | 22.07 | 7.01 | 2.62 | 11.54 |
| 29 | 22.75 | 23.09 | 23.32 | 6.48 | 1.92 | 5.92 |
| 30 | 25.53 | 23.46 | 36.25 | 7.09 | 1.04 | 3.78 |
| 31 | 26.00 | 17.59 | 37.01 | 6.12 | .89 | 2.38 |
| 32 | 23.56 | 17.62 | 36.89 | 5.77 | 1.07 | 1.31 |
| 33 | 20.99 | 17.98 | 49.57 | 5.64 | .88 | .71 |
| 34 | 18.92 | 17.85 | 51.14 | 5.58 | .88 | .53 |
| 35 | 17.69 | 17.98 | 51.55 | 5.04 | .84 | .40 |
| 36 | 18.34 | 19.50 | 51.42 | 6.10 | 1.00 | .80 |
| 37 | 18.84 | 18.09 | 51.68 | 4.05 | .88 | .85 |
| 38 | 17.20 | 17.95 | 47.79 | 4.88 | .94 | .64 |
| 39 | 14.89 | | 47.49 | 5.70 | | .37 |
| 40 | 18.17 | | 50.89 | 5.94 | | .78 |
| 41 | 17.88 | | 51.08 | 5.91 | | .58 |

In the actual case tabulated above in Table I, the material was exposed to sodium for 2000 hours such that there has been some inner diffusion of the elements. The cladding composition at the outer surface is seen to be about 42 weight percent nickel, 32% aluminum, 10% chromium and about 11% iron. As can be seen from Table I, the aluminum content decreases from a maximum of about 35%–37% at the surface to 0.5% at a depth of 41 microns.

A comparison of corrosion rates of the aluminized alloy of the invention as compared with other cladding materials which have not been aluminized is shown in the following Table II:

TABLE II

| Alloy | % Ni | Equivalent Yearly Corrosion Rate | | | |
|---|---|---|---|---|---|
| | | Linear Equation | | Logarithmic Equation | |
| | | μm | mils | μm | mils |
| AISI 316 | 12 | 10.92 | 0.43 | 8.94 | 0.35 |
| D11 | 20 | 13.93 | 0.55 | 9.83 | 0.39 |
| D25 | 30 | 6.82 | 0.27 | 5.85 | 0.23 |
| D66 | 45 | 29.74 | 1.17 | 21.44 | 0.84 |
| Aluminized Nimonic PE16 | 25–40 | 2.32 | 0.09 | 2.03 | 0.08 |

The tests set forth in Table II were conducted at 700° C., 1 ppm oxygen, and 6 m/sec. sodium velocity for 2000 hours. The test conditions were the same as those for a previous run that was completed after 500 hours. Furthermore, the samples of the previous run were used in the tests which resulted in the tabulation of Table II. Least-squares analysis of the 500-hour corrosion data from the initial 500-hour run and the 2500-hour cumulative corrosion data from the tests which is tabulated in Table II were performed. The data were fitted to the equations:

$$R = a_1 t + b_1$$

and $$\log R = a_2 \log t + b_2$$

where R is the weight loss in $\mu g/mm^2$, t is the test time in 1000-hour units and $a_1$, $b_1$, $a_2$ and $b_2$ are constants. The linear and logarithmic equivalent yearly corrosion rates as calculated are shown in the foregoing Table II.

The corrosion rate of Alloy D11 is close to that of the reference AISI 316 alloy. Alloy D25 shows good corrosion characteristics. Although the corrosion rate of Alloy D66 is unacceptably high, it is approximately 50% of that calculated for the initial 500-hour run. The aluminized Alloy PE16 containing 25%–40% nickel maintained its excellent corrosion characteristics even after exposure to sodium at 700° C. for 2000 hours.

The intermetallic nickel-aluminum compounds of the invention will also act as a barrier against $^{60}Co$ and $^{58}Co$ migration, and may well act as sinks for Co isotopes. If an aluminum oxide layer should develop on the surface, it too will be resistant to sodium corrosion. Commercial alumina fails in sodium because of attack upon the $SiO_2$ impurities. It should be noted, however, that the incorporation of silicon into the aluminide, as is done in some processes to protect against corrosion of superalloys by atmospheres containing sulfates, chlorides and oxygen, is not possible here. It will further be appreciated that the aluminum forms no long-lived radionuclide, nor is it unfavorable from a neutron-absorption standpoint. The aluminide may or may not be an effective diffusion barrier against sulfur, depending upon the tendency for sulfur to migrate to the aluminide coating to form $Al_2S_3$.

Defects in the coating are not serious from a $^{54}Mn$ release standpoint. In this regard, a defect will permit the release of $^{54}Mn$ but only in an amount proportional to the area of the defect. Defects will permit normal corrosion rates of the alloy in the area of the defect; however these are not serious unless the defect is coincident with a location on the fuel pin where the temperature is 1200° F. or above.

Although the invention has been shown in connection with certain specific embodiments, it will be readily apparent to those skilled in the art that various changes in form and arrangement of parts may be made to suit requirements without departing from the spirit and scope of the invention.

We claim:

1. A LMFBR coated nuclear fuel element cladding tube comprising;
    a stainless steel alloy containing at least 10% nickel; a means for reducing radially outward diffusion of a radionuclide formed in said stainless steel alloy during irradiation; wherein said radionuclide is $^{54}Mn$; a means for reducing liquid sodium wastage of said tube; an aluminide coating of about 1 to 1.5 mils in thickness formed by diffusing aluminum into a surface of said tube; said aluminide coating comprising said means for reducing radially outward diffusion and said means for reducing liquid sodium wastage of said tube; and wherein said aluminide coating comprises nickel aluminide phases and is substantially free of silicon.

2. The coated cladding tube according to claim 1 wherein said stainless steel alloy is selected from the group consisting of AISI 300 series stainless steel alloys containing at least 10% nickel.

3. The coated cladding tube according to claim 2 wherein said stainless steel alloy is an AISI 316 alloy.

* * * * *